United States Patent
Haas et al.

(10) Patent No.: US 7,216,433 B2
(45) Date of Patent: May 15, 2007

(54) SABER SAW TOOL

(75) Inventors: Guenter Haas, Kaufering (DE); Louis Widmer, Ulisbach (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/122,861

(22) Filed: May 5, 2005

(65) Prior Publication Data

US 2005/0262708 A1 Dec. 1, 2005

(30) Foreign Application Priority Data

May 6, 2004 (DE) ................... 10 2004 022 361

(51) Int. Cl.
*B27B 19/09* (2006.01)
*B23D 49/10* (2006.01)

(52) U.S. Cl. .............................. 30/393; 30/392; 30/394

(58) Field of Classification Search ................. 30/392, 30/393, 394, 372, 374, 375, 376; 74/40, 74/44, 45, 48, 49
See application file for complete search history.

(56) References Cited

U.S. PATENT DOCUMENTS

| | | | | |
|---|---|---|---|---|
| 2,775,272 A * | 12/1956 | Papworth | ..................... | 30/393 |
| 3,404,574 A * | 10/1968 | Stelljes | .......................... | 74/50 |
| 3,802,079 A * | 4/1974 | Ketchpel et al. | ............... | 30/376 |
| 3,945,120 A * | 3/1976 | Ritz | ............................ | 30/393 |
| 5,025,562 A * | 6/1991 | Palm | ........................... | 30/392 |
| 5,079,844 A * | 1/1992 | Palm | ........................... | 30/392 |
| 5,212,887 A * | 5/1993 | Farmerie | ..................... | 30/393 |
| 5,479,711 A * | 1/1996 | Hathcock | .................... | 30/393 |
| 5,555,626 A * | 9/1996 | Fuchs | .......................... | 30/393 |
| 5,940,977 A * | 8/1999 | Moores, Jr. | .................. | 30/392 |
| 6,508,151 B1* | 1/2003 | Neitzell | ......................... | 83/34 |
| 6,634,107 B2* | 10/2003 | Osada | ......................... | 30/392 |
| 2001/0034941 A1* | 11/2001 | Bednar et al. | ................ | 30/392 |
| 2003/0051352 A1* | 3/2003 | Clark, Jr. | ..................... | 30/392 |
| 2004/0255474 A1* | 12/2004 | Wang | .......................... | 30/392 |

\* cited by examiner

*Primary Examiner*—Boyer D. Ashley
*Assistant Examiner*—Edward Landrum
(74) *Attorney, Agent, or Firm*—Abelman, Frayne & Schwab

(57) ABSTRACT

The present invention relates to a reciprocating saw tool (10) having a motor drive (17) with a reciprocating driver (21) for a tool (15) and having a mass equilibrating body (22). In addition, a device (20) is provided, which serves to convert a rotary movement of the motor drive (17) into a reciprocating movement of the reciprocating driver (21) along a first movement axis (41) and an opposite reciprocating movement of the mass equilibrating body (22) along a second movement axis (42). For improving the sawing performance, the mass equilibrating body (22) is guided at an angle α to the reciprocating driver (21) so that its movement axis (42) is constantly at an angle to the movement axis (41) of the reciprocating driver (21).

3 Claims, 2 Drawing Sheets

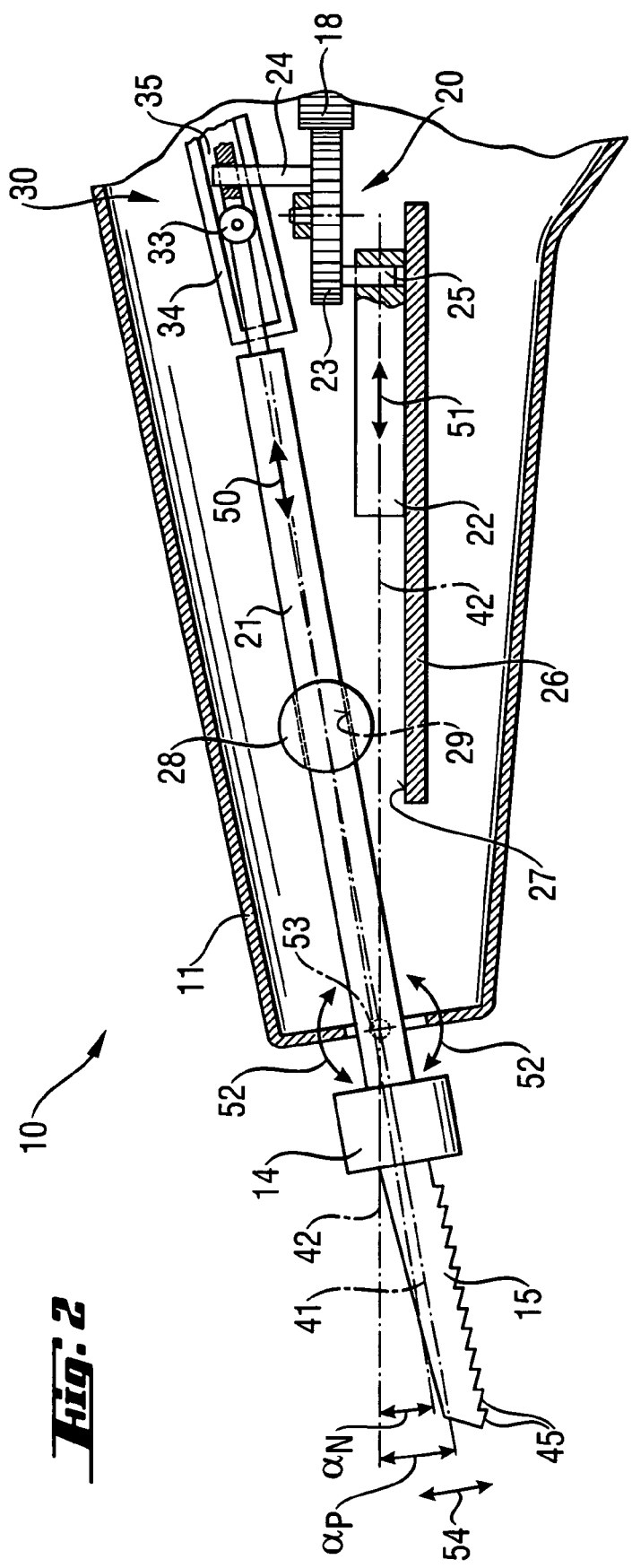

SABER SAW TOOL

BACKGROUND OF THE INVENTION

The present invention relates to a saber saw tool having a motor drive with a reciprocating driver means for a tool having a mass equilibrating body and a device for converting a rotary movement of the motor drive into a reciprocating movement of the reciprocating means along a first movement axis and an opposite movement axis. In this tool the mass equilibrating body is guided at an angle α to the reciprocating driver means such that the movement axis runs constant at an angle to the movement axis of the reciprocating driver means. This type of saber saw tool is a saber saw or a jigsaw, wherein a saw blade can be displaced in a reciprocating movement using a driving arrangement.

In saber saw tools a counterweight is provided for balancing the unbalance of the reciprocating means such as a stroke rod, which is operated with the reciprocating means in the direction opposite to the drive train.

U.S. Pat. No. 6,634,107 discloses this type of weight compensation in a driving arrangement of a reciprocating saber saw, which can be operated in an oscillating reciprocating mode or in a purely reciprocating mode. In the aforementioned driving arrangement, a counterweight is operated by a driven shaft opposite to a stroke rod. In oscillating operation of the oscillating reciprocating saw, the direction of movement of the stroke rod in the course of the oscillating movement is brought intermittently into a tilted position relative to the direction of movement of the counterweight. In pure reciprocating operation, on the other hand, the directions of movement of the stroke rod and the counterweight run parallel to each other.

In U.S. Pat. No. 6,634,107, with the movement of the stroke rod and, thereby, of the plunger and counterweigh parallel to each other and with both the plunger and the counterweight having centroids that agree with each other, no torque and no immanent contact force, which can be superimposed on the contact force applied by the saw user, is generated during the pure reciprocating mode. With the cutting performance being determined only by the contact force applied by the user, the cutting performance of the saw in pure reciprocating mode is rather low.

SUMMARY OF THE INVENTION

The object of the present invention is to develop a driving arrangement of the aforesaid type, which has an improved cutting performance.

This object is achieved according to the invention by a mass compensation body being guided in an angle α to the reciprocating drive means, so that its direction of movement runs constant at an angle to the direction of movement of the reciprocating driving means. This angle of the directions of movement relative to each other in the operating position without oscillating stroke corresponds to the angle α of the mass compensation body to the reciprocating driving means. When this is done, reciprocating driving means and mass compensation body are never guided parallel to each other.

By this measure, an equilibrium of mass achieved and at the same time a torque is generated about a pivot point. In this instance, the pivot point lies approximately in the crossover point of the two directions of movement [lit. "axes of movement"]. The torque, which is generated in two directions of rotation, effects a higher contact force of the saw blade on the workpiece and results in a higher sawing performance.

If a reciprocating stroke is provided, then the angle α in the operating position using reciprocating stroke lies in a range of αN to αP because of the reciprocating movement, whereby αP designates the normal angle in superimposed oscillating reciprocation and αN designates the normal application angel without oscillating reciprocation. However, stroke driving means and mass equilibration bodies are never guided parallel to each other in this situation.

Furthermore, it is advantageous, if the angle α between the guide of the mass equilibrating body and the stroke driving means lies in the range from 2° to 30°. In this range, the sawing performance in oscillating reciprocating mode and in pure reciprocating mode is optimized.

It is particularly advantageous, if the angle α between the guide of the mass equilibrating body and the stroke driving means lies in a range from 3° to 15°, whereby in addition to optimum sawing performance any influences on mass equilibrating effect are minimized.

BRIEF DESCRIPTION OF THE DRAWINGS

Advantages and procedures of the invention will become apparent from the following description with reference to the drawings, wherein:

FIG. 2 shows a cut-out of the hand tool of FIG. 1 in oscillating reciprocating mode.

DETAILED DESCRIPTION OF THE INVENTION

Figure 1:
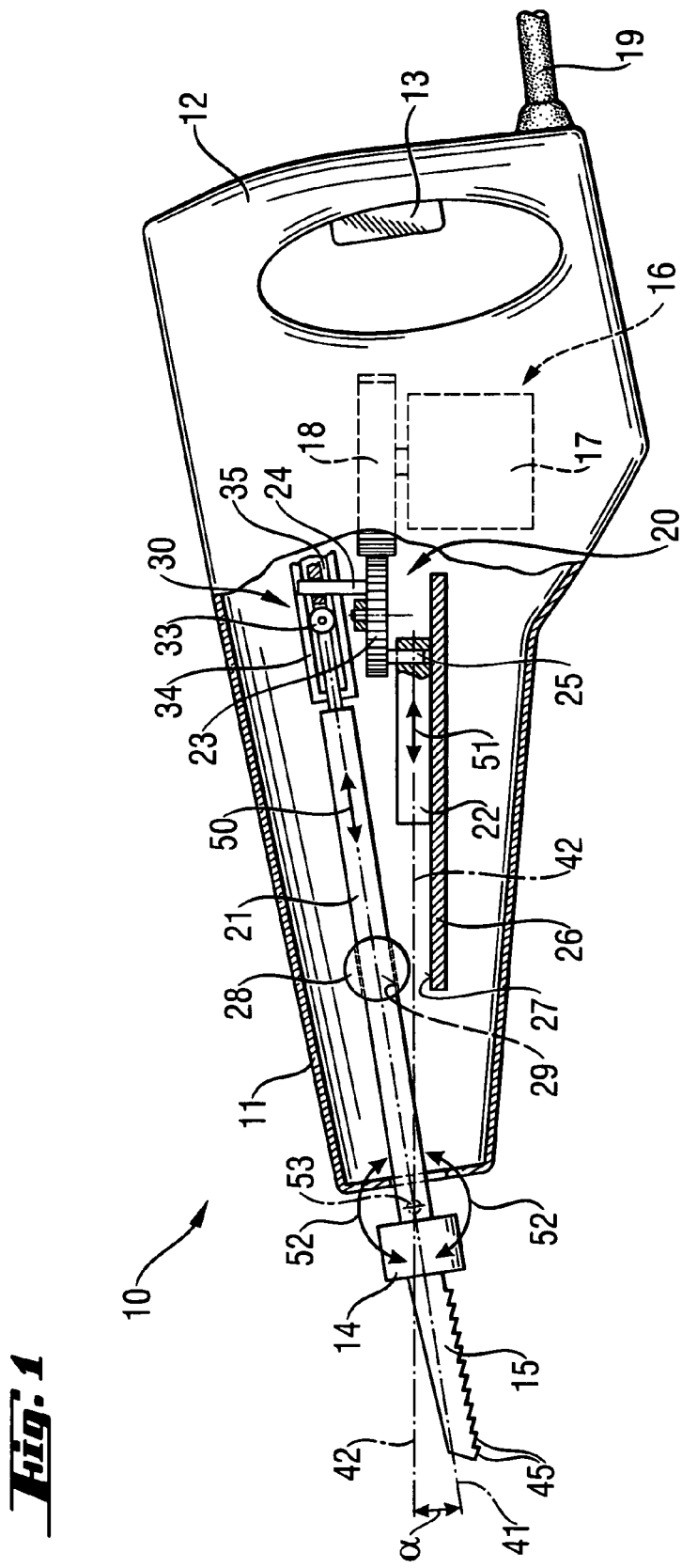
FIG. 1 shows a reciprocating saw tool in pure reciprocating mode in a partially cut-out side view.

FIGS. 1 and 2 represent a reciprocating saw tool 10 configured as a saber saw, wherein a driving arrangement is arranged in a single- or multiple-part housing 11. The driving arrangement 16 comprises a motor drive 17 such as an electrical motor and a device 20 for converting a rotary movement of the motor drive 17 into a reciprocating movement of a reciprocating drive means 21 along a first axis of movement 41 and a reciprocating movement of the mass equilibrating body 22 moving in the opposite direction along a second axis of movement 42. The power supply of the reciprocating saw tool 10 uses a mains connection 19 such as a power cable that can be connected to a power supply. Alternatively, a storage battery or a battery array, etc. can be used for providing power to the reciprocating saw tool.

Furthermore, a handle 12 is formed on the reciprocating saw tool 10 on which a switching means 13 is provided for actuating the reciprocating saw tool 10. A tool holder 14 at which a tool 15, such as a saw blade, can be attached is situated at the end of the reciprocating saw tool 10 opposite the handle 12. The tool holder 15 is arranged at the free end of a reciprocating drive means 21 such as a reciprocating rod.

The device 20 comprises a transmission member 23 such as a gear, which enmeshes the one motor driver 18 of the motor drive 17 such as a driver gear. The transmission member 23 is mounted in a bearing receptacle to be rotational. Two eccentric drivers 24 and 25 are arranged on the transmission member 23. The eccentric drivers 24 and 25 are formed by lugs eccentrically arranged on the transmission member 23, said lugs being arranged diametrically opposite each other on a front surface of the transmission member 23.

The reciprocating driver means 21 configured as a reciprocating rod is guided in a bearing receptacle 29 of a bearing element 28 arranged in the housing 11. A recess is provided on the end of the reciprocating driver means 21 facing the drive arrangement 16. The eccentric driver 24 or the first lug of the device 20 engages into the recess on the end of the reciprocating driver means 21 facing the drive arrangement 16. The reciprocating driver means 21 is guided using guide rollers 33 arranged laterally relative to the recess, in guide recesses 35 of a guide element 34. The guide element 34 is an oscillating reciprocating device generally designated using 30 and is adjustable in its tilt in the hand tool 10.

The orientation of the guide element (as represented in FIG. 1) coaxial to the reciprocating driver means 21 is in a position in which it executes purely reciprocating movements in the directions 50 in the axis of movement 41. The oscillating device 30 is not activated.

The mass equilibrating body 22 is guided at an angle $\alpha$ to the reciprocating driver means 21 on the glide bearing surface 27 of a bearing means 26. The mass equilibrating body 22 has a recess. The second eccentric driver 25 or the second lug of the device 20 engages into the recess of the mass equilibrating body 22. The mass equilibrating body 20 is moveable on the glide bearing surface 27 along its axis of movement 42 in the directions 51.

In the operation of the reciprocating tool 10, by placing the reciprocating driver means 21 at an angle $\alpha$ to the mass equilibrating body 22, a torque (double arrow 52) is generated around a fictive pivot point 53. By virtue of this torque, an additional contact force of the tool 15 in the direction towards the workpiece to be worked (not shown here) or in the direction of its saw teeth 45 is achieved upon each reverse stroke of the reciprocating driver means 21, which results in a higher sawing performance.

In the reciprocating saw tool 10 in FIG. 2, the oscillating reciprocating device 30 is activated by shifting the inclination of the guide element 34 using the guide recesses 35. This can be achieved by manual operation of an adjusting means (not shown). In the operation of the reciprocal saw tool 10, the reciprocating movement is superimposed by an oscillating movement, which is indicated by the double arrow 54. Upon each stroke, the reciprocating driver means 21 is swivelled up and down about the bearing element 28. The angle $\alpha$ therefore lies in a range from $\alpha N$ to $\alpha P$, depending on which phase of the oscillating reciprocation the reciprocating driver means 21 happens to be at that moment. Herein $\alpha P$ designates the angle in superimposed oscillating stroke and $\alpha N$ the normal application angle without oscillating stroke. In the present exemplary embodiment, the angle $\alpha$ is greater than 0 and provides the additional contact force in the oscillating stroke setting.

What is claimed is:

1. A reciprocating saw tool operable in an oscillating reciprocating mode and a purely reciprocating mode, the saw tool comprising a motor drive (17); reciprocating driver means (21) for a tool (15); a mass equilibrating body (22); a device for converting a rotary movement of the motor drive (17) into a reciprocating movement of the reciprocating driver means (21) along a first movement axis (41) and a reciprocating movement of the mass equilibrating body (22) in a direction opposite a direction of movement of the reciprocating driver means (21) and along a second movement axis (42) that extends at a constant angle $\alpha$ relative to the first movement axis (41) in the purely reciprocating mode, wherein the constant angle $\alpha$ is in a range between 2° and 30°; and means (30) for superimposing oscillating movement on the reciprocating driver means (21) for oscillating the reciprocating driver means (21) within an angle ($\alpha N$–$\alpha P$) lying in a range between 2° and 30°.

2. The reciprocating saw tool of claim 1, further comprising a switchable oscillating device (30) for the reciprocating driver means (21), wherein the angle a between the mass equilibrating body (22) and the reciprocating driver means (21) varies, during a stroke cycle between the value $\alpha aN$ and $\alpha P$.

3. The reciprocating saw tool of claim 1, wherein the angle $\alpha$ is in a range between 3° and 15°.

* * * * *